3,396,038
CHEWING GUM
Edmund C. Knapp, Wilbraham, Mass., assignor to Monsanto Company, St. Louis, Mo., a corporation of Delaware
No Drawing. Application June 11, 1965, Ser. No. 463,350, which is a continuation-in-part of application Ser. No. 7,127, Feb. 8, 1960. Divided and this application July 31, 1967, Ser. No. 657,051
3 Claims. (Cl. 99—135)

ABSTRACT OF THE DISCLOSURE

Chewing gum comprising a water-insoluble, graft copolymer of vinyl acetate-polyoxyalkylene compound, filler, flavoring agent and sweetening agent.

CROSS REFERENCES TO RELATED APPLICATIONS

This application is a division of copending application Ser. No. 463,350, filed June 11, 1965, and now abandoned which, in turn, is a continuation-in-part of patent application Ser. No. 7,127, filed Feb. 8, 1960, and now abandoned.

BACKGROUND OF THE INVENTION

1. Field of the invention

This invention relates to chewing gums which are classified in Class 99, Subclass 135. More particularly it relates to chewing gums wherein the resinous base is a graft copolymer of a vinyl ester with a polyoxyethylene compound wherein the vinyl ester constitutes about 85% to 97% of the total copolymer weight.

2. Description of the prior art

Germain in U.S. Patent 3,033,841 (May 8, 1962), teaches graft copolymers of vinyl acetate with a polyoxyalkylene compound which are similar to the resin base used in the present invention. However, Germain fails to teach the novel use of these resins which is disclosed in the present invention.

Buselli in U.S. Patent 3,018,274; Meguro et al. in U.S. Patent 3,063,844 and Sullivan et al. in 3,117,872, teach the use of vinyl acetate polymers and copolymers as chewing gum bases. However, the foregoing references fail to teach the use of the unique copolymers of the present invention as chewing gum bases.

SUMMARY OF THE INVENTION

Chewing gums were originally prepared from natural resinous material bases, the best known of which was chicle. In more recent years, synthetic resins such as polyvinyl acetate have replaced the natural resin as the major constituent of the gum base, but it has heretofore still been necessary to blend the natural resin with the synthetic resin in order to obtain the necessary balance of properties for an acceptable gum. Along with the necessity for blending the natural with the synthetic resin, it has also been necessary to add plasticizers for the synthetic resin in order to provide a chewing gum having an adequate degree of masticability. The present invention solves the problem of compounding a chewing gum base and provides a chewing gum base without restoring to plasticizers or natural resins.

It is an object of this invention to provide a simplified chewing gum base which, without the addition of plasticizers or natural resins, produces chewing gum having improved masticable characteristics.

It is another object of the invention to increase the ease with which a chewing gum can be produced as well as decreasing the number of ingredients used.

It is still another object to provide a chewing gum which will have improved moisture pick-up thereby decreasing the amount of gum base required to obtain a given volume chew.

It is still another object of this invention to provide a chewing gum requiring less mastication to reduce the solid gum to a comfortable chew.

These and other objects are accomplished with a chewing gum base comprising the solid hydrophilic, water-insoluble, non-toxic copolymer of a vinyl ester with a polyoxyalkylene compound, the copolymer having a viscosity within the range of about 1 to 25 centipoises in a one molar benzene solution at 20° C.

In accordance with the objects of this invention the finished chewing gum product may be compounded with as few as four ingredients namely, the aforementioned chewing gum base, a sweetening agent, a mineral filler, and flavouring. The concentration of the vinyl ester copolymer comprising the chewing gum base in the final gum product can range generally from 10 to 97% of the chewing gum. The proportions of the other named agents in the final chewing gum can range from 0 to 40% filler, 1 to 30% flavour agents, and sufficient sweetening agent to suit the desired taste. The preparation of the final chewing gum product containing the vinyl ester copolymer base of the present invention is not complex and any of the known means for the preparation of conventional chewing gum products may be employed.

The invention may be practiced in its preferred embodiments as illustrated in the following examples and subsequent discussions thereon. Where parts and percentages are used in this specification and claims, they are parts and percentages by weight unless otherwise designated.

EXAMPLE 1

To illustrate the preparation of a suitable vinyl ester copolymer for the practice of the present invention, vinyl acetate monomer was polymerized in the presence of polyethylene glycol as follows.

97 parts of vinyl acetate monomer, 12 parts of polyethylene glycol having an approximate molecular weight of 600, 81 parts of methyl ethyl ketone, 25 parts of water, 0.17 part of sodium bicarbonate, and 0.22 part of hydrogen peroxide were placed in a reaction vessel and agitated under reflux for 3 hours. The batch temperature was then slowly increased and the condenser set to remove rather than return the vapours. Sufficient water was added to the reaction mixture during the removal of the vapours, to at least maintain a slurry of the soft polymer in water. The vapours, containing methyl ethyl ketone in unreacted vinyl acetate with some water, were driven off as the batch temperature was increased to approximately 95° C. When most of the ketone had been removed, the precipitated copolymer was allowed to settle from the water layer and was then drawn from the reaction kettle through a bottom valve. It was then dried in vacuum at 60° C. for 5 hours.

A one molar solution of the dry copolymer in benzene had a viscosity of 1.5 centipoises at 20° C. and a softening point of 64° C. by the Fischer-Johns method. The 24-hour moisture pick-up for a sample of the above polymer was 240%, as compared with 10% for polyvinyl acetate and 9% for a vinyl acetate-oleate copolymer, both of the latter polymers being the low molecular weight form of the material suitable as chewing gum bases.

EXAMPLE 2

To illustrate an alternative method for the preparation of the vinyl ester copolymer chewing gum bases of the present invention, a vinyl acetate-polypropylene glycol copolymer was prepared as follows.

The following materials were charged to a reaction vessel which was fitted with means by which liquids could be added during the reaction.

| | Parts |
|---|---|
| Vinyl actate monomer | 100 |
| Polypropylene glycol (molecular weight approximately 2000) | 12½ |
| Methyl ethyl ketone | 200 |
| Water | 20 |
| Hydrogen peroxide | 0.62 |
| Sodium bicarbonate | 0.50 |

This mixture was heated to reflux temperatures and then 300 parts of vinyl acetate monomer were added slowly over a period of approximately 180 minutes. After 240 minutes at reflux temperature, conversion of approximately 80% had occurred. The copolymer was separated and dried. A one molar solution of the product in benzene had a viscosity of 1.7 centipoises at 20° C. and a melting point of 68° C. by the Fischer-Johns method. The 24-hour moisture pick-up of a sample of the copolymer was 11%.

EXAMPLES 3 TO 6

To illustrate the suitability of copolymers prepared from a vinyl ester with other molecular weights of polyethylene glycol, the 24-hour moisture pick-up results for copolymers of vinyl acetate containing 85% by weight vinyl acetate and 15% by weight polyethylene glycol are reported in tabular from below:

| Example | Molecular Wgt. of Polyethylene Glycol | 24-Hour Moisture Pick-Up, Percent |
|---|---|---|
| 3 | 600 | 780 |
| 4 | 1,000 | 550 |
| 5 | 1,540 | 750 |
| 6 | 4,000 | 670 |

It will be first noted, that although the copolymer of Example 3 was prepared from the same molecular weight polyethylene glycol as used in Example 1, the moisture pick-up results for the two examples differ because of the different molecular weights of the copolymers.

EXAMPLES 7 TO 10

To illustrate the preparation of suitable vinyl ester copolymers from different polyoxyalkylene compounds than the polyalkylene glycols hereinbefore employed in the preceding examples, the following copolymers of vinyl acetate with block copolymers of ethylene oxide-propylene oxide containing 97% vinyl acetate and 3% of the block copolymer were prepared according to the method described in Example 1. The materials and proportions used and the results obtained are tabulated below:

COMPOSITIONS OF POLYOXYALKYLENE COMPOUND

| Example | Percent Ethylene Oxide | Average Molecular Weight | 24-Hour Moisture Pick-Up, Percent |
|---|---|---|---|
| 7 | 10 | 1,700 | 24 |
| 8 | 20 | 2,000 | 62 |
| 9 | 40 | 3,000 | 40 |
| 10 | 80 | 8,000 | 135 |

The moisture pick-up tests reported above were conducted by gravimetric weighings of samples both before and after a 24-hour immersion in water at 40° C. The weighing sample comprised a 1 gram quantity of the polymer adhering to an aluminum plate. The weighing of a wetted sample was made after removal of the unabsorbed water by means of blotting the sample with water-absorbent paper. The moisture pick-up was calculated on a percentage basis from the difference between the weight of the sample before and after immersion.

Additional moisture pick-up measurements were made on the compositions of the present invention after relatively short water-immersion periods of 1 hour to indicate the time rate of moisture pick-up. More specifically, it is believed that the greater the rate at which the composition picks up moisture, the less time will be required to masticate the solid gum to a comfortable chew. The percent moisture pick-up for these measurements are as follows:

| Composition: | 1-Hour moisture pick-up, percent |
|---|---|
| Ex. 2 | 3.2 |
| Ex. 3 | 170.0 |
| Ex. 4 | 125.0 |
| Ex. 5 | 285.0 |
| Ex. 6 | 240.0 |
| Ex. 7 | 5.0 |
| Ex. 8 | 12.5 |
| Ex. 9 | 10.0 |
| Ex. 10 | 47.0 |
| Vinyl acetate homopolymer (1.3 cps.) | 3.0 |
| Vinyl acetate homopolymer (1.5 cps.) | 2.5 |
| Vinyl acetate-vinyl oleate copolymer | 3.2 |

From the above results, it will be noted that all of the compositions of the present invention illustrated, indicate the requirement of less mastication than for a similar polyvinyl acetate homopolymer chewing gum base. Likewise, the invention compositions are either equal to or an improvement over a vinyl acetate-vinyl oleate copolymer chewing gum base with respect to this characteristic.

The vinyl ester copolymer chewing gum bases of the present invention may best be characterized as being capable of being plasticized by water alone and having improved masticability or chewability. The water plasticization characteristic of the present type chewing gum bases is pronounced that both the relative amount of water picked up as well as the rate of water pick-up is much greater than for other known chewing gum bases as hereinbefore illustrated. This is not to say that the plasticization of the present polymers by water is not hastened by the use of other agents found in the gum such as sugar, but it is meant to say that the plasticization does not require the incorporation of conditioning agents or plasticizers such as for instance, propylene glycol or glycerine found in most chewing gums. The present polymers may also be further characterized as not decomposing or depolymerizing readily under the conditions of preparing the chewing gum and are free from the danger of forming toxic substances during said preparation. The polymers are themselves tasteless, odorless, clean and pure.

Useful vinyl ester copolymers for the practice of the present invention may be selected from the class of low molecular weight tasteless, odorless, non-toxic generally water-insoluble copolymers of a vinyl ester with a polyoxyalkylene compound. Copolymers having the improved moisture pick-up may contain as low a content of the polyoxyalkylene compound as 0.5% by weight of the copolymer with the other 99.5% being the vinyl ester. The molecular weight of the copolymer may also vary, ranging in viscosity from about 1 to 25 centipoises, in a one molar benzene solution at 20° C.

Employable viscosities can vary in accordance with the presence of such optional constituents of the chewing gum composition, as for example, plasticizers and conditioning agents, etc. which serve to render the compositions more plastic and consequently allow higher viscosity copolymers to be employed to achieve substantially similar masticability characteristics. The preferred copolymers are those possessing rheological properties suitable for the high speed manufacturing equipment generally used for the packaging of the chewing gum composition. Copolymers having this characteristic as well as the other desirable physical and physiological properties disclosed comprise about 97% to 85% of the vinyl ester and about 3% to about 15% of the polyoxyalkylene compound, with viscosities for a one molar benzene solution of the copolymer from 1 to 6 centipoises at 20° C. Suitable vinyl esters for the preparation of the copolymers can be selected from the general class of vinyl esters of the lower alkanoic acids which contain from 2 to 18 carbon atoms, including vinyl acetate, vinyl butyrate, vinyl stearate and vinyl 2-ethyl-hexoate. It is also believed that suitable copolymers of the vinyl ester can be prepared from mixtures of vinyl esters such as vinyl acetate and vinyl stearate with the polyoxyalkylene compound, by the way of polymerizing the mixture of vinyl ester monomers in the presence of the polyoxyalkylene compound as described heretofore. Vinyl acetate is the preferred vinyl ester not only because of its lower cost but also because useful copolymers of the present invention made with vinyl acetate possess greater dimensional stability than those made from other vinyl esters.

Suitable polyoxyalkylene compounds for the preparation of the vinyl ester copolymers comprising the novel chewing gum bases of the present invention can be selected from the general class of tasteless non-toxic polyalkylene glycols consisting of polyethylene glycol, polypropylene glycol, polybutylene glycol and derivatives thereof. The useful compounds may best be characterized as surface active agents in nature by way of having both hydrophobic and hydrophilic portions of the polymer. The average molecular weight of the useful polyoxyalkylene compounds is in the range of 200 to 10,000. Commercial examples of these products are the "Carbowax" polyethylene glycols made by the Union Carbide Chemicals Company, the "polyglycol" series of polypropylene glycols made by The Dow Chemical Company and the "Pluronics" which are derivatives of the polyalkylene glycols, manufactured by the Wyandotte Chemicals Corporation.

The suitable derivatives of the polyalkylene glycols include both the type having the following general formula:

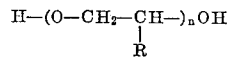

where R represents either —H or —CH$_3$ or alkyl groups containing from 1 to 4 carbon atoms and $n$ is an integer from 2 to about 300, as well as the type having the general formula:

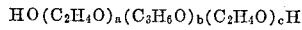

where $a$ is an integer from 1 to 100, $b$ is an integer from 1 to 50, and $c$ is an integer from 1 to 100.

The latter type of suitable polyoxyalkylene compound may be selected from the general class of reaction products of a hydrophobic base material with ethylene oxide, which reaction products have surface active properties. Suitable polyoxyalkylene compounds of this class are taught in U.S. Patents 2,674,619 and 2,677,700 along with suitable methods of preparation. In general, the hydrophobic base material is an adduct of a reactive hydrogen atom containing compound and an oxide containing three or more carbon atoms. The reactive hydrogen atom containing compound can be characterized as being of sufficiently short chain length so as not to be convertible to a surface active agent by means of reaction with ethylene oxide. The reactive hydrogen atom containing compound is reacted with a sufficient amount of the oxide containing three or more carbon atoms so that the adduct produced is oil soluble and when reacted with ethylene oxide forms the surface active agent. Suitable oxides having three or more carbon atoms for forming the hydrophobic base include propylene oxide, butylene oxide, styrene oxide, cyclohexene oxide and others. The reactive hydrogen atom containing compound is not limited to those compounds having only one such atom, since such compounds containing more than one reactive hydrogen atom will also produce excellent surface active agent materials. The ethylene oxide content in this type polyoxyalkylene compound can be 10 to 90% of the total weight.

It has been noted that the moisture pick-up on 24 hours immersion in water is higher for the copolymers with polyethylene glycol than those with polypropylene glycols. The preferred copolymers will pick up over 50% moisture in this test with at least 200% being especially preferred. However, even those that only pick up 11% may be used advantageously as chewing gum bases although the plasticization by moisture will be aided by the presence of sugar and other plasticization agents may be incorporated. Although polyoxyalkylene compounds may be used of higher molecular weight, compounds having a molecular weight of not more than 2,000 provide optimum results. These copolymers are graft copolymers in that the copolymerization of the vinyl esters is carried out with polyoxyalkylenes having a molecular weight of a least 200, thereby providing a polymeric segment or backbone upon which the vinyl ester monomer is copolymerized.

Fillers employed in the final gum product of the present invention must be finally ground, inert in the mixture, non-toxic, tasteless, and of hardness not higher than that of the tooth enamel so as to avoid its abrasion. It should also be capable of being chewed in the mouth without becoming crumbly as is characteristic of some unsuitable fillers. Precipitated chalk is preferable for the bulk of the filler but the iron oxides and even charcoal may be used in amounts sufficient to color the mix. Mixtures of fillers may also be employed, the preferred range for the filler in the final gum product is from about 15% to about 33% since further overloading with filler has a disadvantage of lowering the amount of sugar which the base can carry. Suitable fillers having the mentioned characteristics are well-known and commercially available.

Suitable flavoring agents for the final gum product are also well-known and include oil of wintergreen, oil of spearmint, oil of peppermint, licorice, fruit flavors, and spice oils. The sweetening agents which may be employed can be selected from the general class of non-toxic sweetening agents which includes such natural products as sucrose or dextrose and/or they may be artificial sweeteners such as cyclamates or saccharin.

It is not intended to limit the present invention to only those compositions containing the mentioned agents, since it is well known in the art to incorporate other optional ingredients in the final gum product where desired. For example, it may be desirable to modify the disclosed compositions by the addition of such known agents as waxes, conditioning agents, or even other resinous materials in order to facilitate the high speed manufacturing process generally employed in the preparation of the final gum product. It may also be desirable to include medicinal compounds in the final gum product so as to obtain a composition having therapeutic value. It is therefore obvious that many modifications of the present invention may be made without departing from the spirit and scope thereof.

What is claimed is:

1. A chewing gum comprising:
   (A) 10 to 97% of a water-insoluble, graft copolymer of vinyl acetate with a polyoxyalkylene compound selected from the group consisting of polyethylene glycol and a block copolymer of ethylene oxide and propylene oxide, said polyoxyalkylene compound having a molecular weight in the range of 200 to 10,000; wherein the vinyl acetate and the polyalkylene compound are in such proportions that the vinyl acetate units constitute from about 85% to about 97% of the total copolymer weight, the copolymer having a viscosity within the range of about 1 to 6 centipoises in a 1 molar benzene solution at 20° C. and a moisture pickup of at least 11% upon 24 hours immersion in water at 40° C.
   (B) 0 to 40% filler,
   (C) 1 to 30% flavoring agent, and
   (D) a minor amount of a sweeting agent.

2. A chewing gum as a claim 1 wherein the copolymer is of vinyl acetate with polyethylene glycol having a molecular weight of 200 to 2,000.

3. A chewing gum as in claim 1 wherein the copolymer is of vinyl acetate with a block copolymer of ethylene oxide and propylene oxide.

(References on following page)

References Cited

UNITED STATES PATENTS

| | | | |
|---|---|---|---|
| 3,033,841 | 5/1962 | Germain | 260—89.1 |
| 3,063,844 | 10/1962 | Meguro et al. | 99—135 |
| 3,218,281 | 10/1965 | Rees | 260—29.6 |
| 3,311,595 | 3/1967 | Kahrs et al. | 99—135 X |

RAYMOND N. JONES, *Primary Examiner.*

S. E. HEYMAN, *Assistant Examiner.*